United States Patent [19]

Tjurin et al.

[11] 4,222,176
[45] Sep. 16, 1980

[54] METHOD AND APPARATUS FOR DRYING GRANULATED DIELECTRIC MATERIALS

[76] Inventors: Nikolai A. Tjurin, Altufievskoe shosse, 18, kv. 297; Georgy V. Lysov, Teply Stan, mikroraion 9V, korpus 9ab, kv. 597; Anatoly S. Koriev, 2 Dorozhny proezd, 6, korpus 2, kv. 174; Nina L. Kuznetsova, Uzkoe, 26, kv. 8; Anatoly T. Zamorenov, 1 Mosfilmovsky pereulok, 4, korpus 3, kv. 18, all of Moscow, U.S.S.R.

[21] Appl. No.: 953,439

[22] Filed: Oct. 23, 1978

[51] Int. Cl.$^2$ ............................................. F26B 3/34
[52] U.S. Cl. ............................................. 34/1; 34/10; 34/57 R
[58] Field of Search ........................... 34/1, 4, 10, 57 R

[56] References Cited
U.S. PATENT DOCUMENTS

| | | | |
|---|---|---|---|
| 3,235,971 | 2/1966 | Tooby | 34/1 |
| 3,508,145 | 4/1970 | Reed et al. | 34/1 |
| 3,771,234 | 11/1973 | Forster | 34/1 |
| 4,055,001 | 10/1977 | Forster | 34/1 |

*Primary Examiner*—John J. Camby
*Attorney, Agent, or Firm*—Lackenbach, Lilling & Siegel

[57] ABSTRACT

A method for drying granulated dielectric materials including superhigh frequency heating of granules which are moved in heating space by a strong hot air flow. The granules are moved at a variable speed, a negative temperature gradient is produced, and humid air is removed from the heating space. According to the invention, the apparatus for drying granulated dielectric materials includes a superhigh frequency generator and a drying chamber which, in turn, has an input waveguide and an output waveguide interconnected by a waveguide elbow. An air inlet and a granules inlet are connected to an input of the input waveguide. The output waveguide has an air separator arranged at its input and a resonator bin arranged at its output.

5 Claims, 3 Drawing Figures

METHOD AND APPARATUS FOR DRYING GRANULATED DIELECTRIC MATERIALS

FIELD OF THE INVENTION

The present invention relates to superhigh frequency heating of dielectric materials and, more particularly, to a method and apparatus for drying granulated dielectric materials.

The invention is chiefly applicable to processes aimed at complete drying, including complete dehydration, of different granulated dielectric materials. It can also be used to dry materials after storage and immediately before use in order to ensure a high quality of cast plastic articles. The apparatus of this invention is applicable to drying cereal and oil crops and to eliminating infestants in agriculture.

BACKGROUND OF THE INVENTION

The process of drying granulated thermoplastic polymer and copolymer materials can be divided into two stages. The first stage includes preliminary drying of materials containing 10 to 20 percent by weight of moisture which is mainly unbound. At this stage, the effectiveness of the drying process is directly proportional to the amount of thermal energy and the time during which the product is exposed to heat. The second stage is a stage of complete drying of materials containing less than one percent of moisture; this is mainly capillary and absorption, or bound, moisture, and the process at this stage is a markedly exponential process.

The first stage of the drying process requires high power levels of superhigh frequency oscillation, i.e. a considerable power input, but the time of exposure is very short, ranging from a few seconds to a few minutes, so there is no risk of the granules being destroyed or fused at the surface. The complete drying carried out during the second stage does not require a great power input, keeping in mind that the heat capacity of the material is almost independent of the moisture content, while the absorptivity is largely determined by the material itself. The heating temperature is determined by the type of changes in the tangent of the dielectric loss angle tg $\delta$ and the fusion temperature. During the second stage, the drying time amounts to scores of minutes.

Thus it may be advisable that the drying processes should be divided into two stages to be carried out in two separate superhigh frequency apparatus which may be connected by some conveyor means, for example, a pneumatic conveyor.

There is known a method for drying polymer materials, which is effected with the aid of a microwave applicator with a conveyor. According to this method, granules of a polymer material are introduced into a resonating chamber and moved through that chamber by an air flow which removes moisture and is let outside the resonating cavity. Vibration is produced to facilitate the motion of granules.

The apparatus for carrying out the above method is a microwave applicator provided with a conveyor for transportation of the product. The apparatus comprises a multimode resonance chamber accomodating a tray having holes therein. Arranged at the opposite ends of the chamber is an inlet and outlet intended for changing and discharging the product, respectively. The inlet and the outlet each include a set of lengths of pipe or waveguides with frequency ranges beyond those of superhigh frequency oscillation. The inlet is arranged on top so that the product can be poured onto the tray under gravity. The tray may be of metal, in which case it serves as the bottom of the chamber. It may also be of a dielectric material transmitting superhigh frequency oscillation.

The tray is provided with slanted openings for passage of air or gas forced into the chamber by a blower. The air drives granules over the surface of the stationary tray and out of the chamber and must be dry because apart from this function it also serves to remove moisture from granules.

The microwave chamber of the applicator may be mounted on shock absorbers. Vibrators may also be provided to vibrate the chamber.

In the latter case granules are moved by vibration, but vibrators can be used in combination with a blower.

A multimode resonance chamber can provide a uniform heating only when the product is mixed. However, no mixing means is included in the apparatus under review.

Vibration and air blowing can ensure a uniform motion of the product only when the latter is moved at a high speed. However, a high speed precludes a complete drying of the product. With the product in slow motion, the air flow is bound to rip up the layer of the granulated product, an effect similar to that taking place in the course of fluidization. As a result, the motion of the product is not uniform and the drying is inadequate.

There is known a method of using superhigh frequency oscillation for drying granulated polymer materials (cf. U.S. Pat. No. 3,771,234 of Sept. 9, 1969), such as butadienestyrene latex, polyvinyl chloride and polyisobutylene. According to this method, a hot air flow is used to bring granules to a heating zone. At first, the heating of the granules is carried out at a frequency of 915 megs during a time sufficient to reduce the moisture content to 5 percent, whereupon the heating is carried out at a frequency of 2,450 megs during a time sufficient to reduce the moisture content to 5,000 p.p.m., i.e. 0.5 percent. Upon drying the material, the air is removed with the aid of a cyclone-type device.

The drying time is 1 to 10 seconds at the first stage, and 1 to 3 seconds at the second stage.

The granulated material moves at a speed of a few tens of meters per second, which means that the drying temperature should be reached during a few seconds. This necessitates a considerable superhigh frequency power input, as well as high temperature air used to transport the granules. Destruction of the granules due to the intensified evaporation is avoided by providing for a positive temperature gradient $\Delta t = \bar{i} \cdot n$ ° C. of the granules, where $\bar{i}$ is the mass and heat transfer vector. With a positive $\Delta t$, the temperature inside the granules is at least a few degrees lower then the temperature of the outer surface of the granules; under such conditions, it is only the outer surface of a granule that rapidly loses moisture.

An accelerated removal of moisture from the inside of the granules makes it necessary to equalize the inside and outer surface temperatures. It would be ideal to have a negative temperature gradient $\Delta t$ in the granules, at which the internal temperature of a granule is higher than the temperature of its outer surface. However, the method under review does not make it possible to attain this goal. For example, according to this method, butadiene-styrene latex with an original moisture content of 20 percent is dried in two zones of a waveguide channel having a diameter of 3.5 inches and a total length of 150 feet. In the first zone, the heating is effected at a frequency of 915 megs (L-range) and the power input is 75 kw. In the second zone, the heating is carried out at a frequency of 2,450 megs (S-range) and the power input is 25 kw. The heating is further intensified by a flow of air, whereof the temperature is 250° F. and the flow rate is 400 m³ per hour. The time of interaction between the granules and the superhigh frequency field is not greater than 5 seconds. The throughput is 1,000 pounds per hour.

PVC Granules are dried with a superhigh frequency power input of 60 kw; the air temperature is 145° F. and the flow rate is about 200 m³ per hour. In the case of PVC, the time of interaction between the granules and the superhigh frequency field is 4 seconds, and the throughput is 500 pounds per hour.

The method under review is such that a granulated material is only dried until the granules can absorb a considerable amount of superhigh frequency oscillation energy and thermal energy of the air flow, i.e. until the permittivity $\epsilon'$ and the tangent of the dielectric loss angle tg $\delta$ are sufficiently great. The power input used for drying the above-mentioned materials is enough the remove the unbound moisture.

The complete drying, i.e. the removal of the capillary and absorption moisture, takes much more time than the preliminary drying, although the content of these types of moisture is normally not greater than 1 percent.

The method under review is carried out by using an apparatus for drying granulated dielectric materials, comprising a drying chamber which is a waveguide of a round section divided into two zones by an oscillation suppressor. Each zone includes several inputs to supply energy produced by superhigh frequency generators. Arranged at the inlet of the first zone are an air blower intended for pneumatic transportation of granules, and a granules charging means. Arranged at the outlet of the second zone of the waveguide is a cyclone separator intended to separate the air flow from the flow of granules. The separator is provided with an exhaust blower. The length of the waveguide's first zone is 20 to 100 feet; the heating in this zone is carried out at a frequency of 915 megs. The length of the second zone is 50 to 80 feet, and the frequency in this zone is 2,450 megs. At the inlet of the first zone, the moist granulated material is caught by the air flow and subjected to preliminary drying while passing through the first zone, complete drying taking place in the second zone. After a period of 3 to 5 seconds, granules are fed to the cyclone separator, wherefrom spent humid air is removed. At this point the material is ready for use.

The apparatus under review can only remove the unbound moisture from granules, i.e. it can only carry out preliminary drying. The time of interaction between the granules and the superhigh frequency field is variable within a period of a few seconds. It must be borne in mind in this connection that complete drying requires several minutes and in some cases even several tens of minutes. In the course of drying, the air used for the transportation of granules becomes humid, in which state it carries the granules all the way from the inlet to the outlet. Over a considerable portion of the first zone, the air temperature is higher than that of the granules, these temperatures being equalized in the second zone. As a result, there is a secondary interaction between the moisture and moist granules, which slows down the drying process and reduces the efficiency of the apparatus.

SUMMARY OF THE INVENTION

It is an object of the present invention to provide a method and apparatus for drying granulated dielectric materials, which would ensure complete drying of granules, including full dehydration.

It is another object of the invention to make the drying highly effective, while curtailing the power consumption.

It is still another object of the invention to reduce the floor space required to install an apparatus for drying granulated materials.

The invention essentially consists in providing a method for drying granulated dielectric materials by superhigh frequency heating of granules moved in the heating space by a strong hot air flow. The method is characterized, according to the invention, by the granules being moved at a variable speed, humid air being continuously removed from the heating space, while fresh air is continuously supplied, and a negative temperature gradient $\Delta t = \bar{i} \cdot n \cdot 10°$ C. is produced in the granules, where i is the heat and mass transfer vector and n is a positive number, for which purpose the air temperature is set at a point 20° to 50° C. below the maximum temperature to which the granules are heated.

Preferably, a variable speed of motion of granules is provided for by dividing the heating space into alternating zones of intensified motion of granules in the air flow and granules accumulation zones where the motion of granules is slowed down.

The invention further consists in providing an apparatus for drying granulated materials, comprising a heating section having a superhigh frequency generator, a drying chamber, an air inlet, a granules inlet, and a superhigh frequency input. The apparatus is characterized, according to the invention, in that the drying chamber is composed of a vertical input waveguide and a vertical output waveguide interconnected by a waveguide elbow, the air inlet and granules inlet being connected to the input of the input waveguide, whereas the output waveguide has an air separator arranged at its input and a resonator bin arranged at its output.

In order to produce a closed granules circulation loop, it is necessary that the resonator bin have an outlet communicating through a hose and a valve with the granules inlet in the heating section, and that the valve should include a granules charging inlet.

In order to provide for a continuous drying process, it is expedient that the apparatus should additionally include $n-1$ heating sections, each having an individual supply of superhigh frequency energy, all the sections being successively interconnected by pipes to produce a single pneumatic conveyor for a continuous flow of granules through the n sections.

BRIEF DESCRIPTION OF THE ACCOMPANYING DRAWINGS

Other objects and advantages of the present invention will become more apparent from the following detailed description of preferred embodiments thereof, taken in conjunction with the accompanying drawings, wherein.

DETAILED DESCRIPTION OF THE INVENTION

Figure 1:
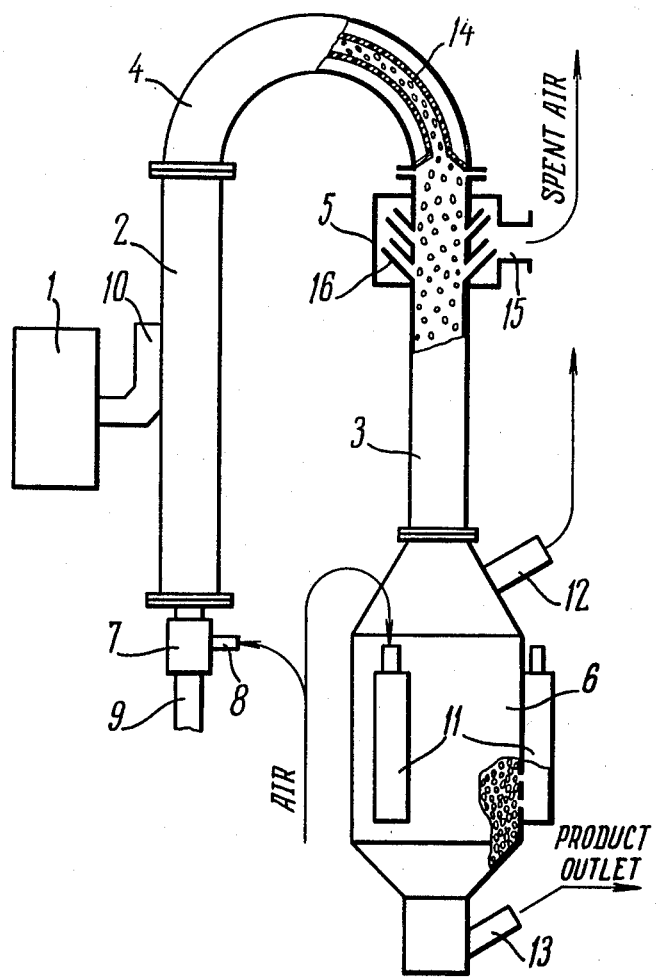
FIG. 1 is a schematic view of an apparatus for drying granulated materials, in accordance with the invention.

The method according to the invention is as follows. A granulated material is dried while the granules move at a variable speed in a superhigh frequency field. The granules are moved at a variable speed due to the fact that the heating space is divided into alternating zones of intensified motion of granules in an air flow used for granules transportation, and granules accumulation zones where granules move slower. Air forced into the heating space has a temperature 20° to 50° C. below the maximum temperature to which the granules are heated, and a negative temperature gradient $\Delta t = i \cdot n \cdot 10°$ C. is produced in the granules. The negative temperature gradient $\Delta t$ means that the temperature inside a granule is higher than the temperature of its air-cooled surface. Spent humid air is continuously removed from the heating space and replaced with an equivalent supply of fresh air; gases released in the course of drying are also removed from the heating space.

The drying process may be continuous or periodical.

For continuous drying, an air flow is used to carry granules first to a zone of intensified granules motion and then to a granules accumulation zone. As this takes place, a superhigh frequency field is produced in the heating space. The spent air is removed from the first zone.

Hot air is forced into the granules accumulation zone and, as it absorbs moisture, is removed therefrom. When the granules accumulation zone is full the dried granules are discharged therefrom to be replaced by an equivalent amount of moist granules, the granules flow rate at the inlet being equal to that at the outlet.

When the drying time has to be increased, use is made of a plurality of alternating zones of intensified motion of granules and granules accumulation zones. From the outlet of the first accumulation zone, granules proceed to the next intensified motion zone, wherefrom they follow to the second accumulation zone to be acted upon by a superhigh frequency field. Spent air is removed from each zone. As the second accumulation zone is filled, the granules proceed therefrom to the next zone of intensified motion, etc.

Dried granules are pneumatically discharged from the outlet of the last zone. The discharge is carried out continuously at a rate equal to the flow rate of granules introduced into the first zone. As mentioned above, the air temperature is set at a point 20° to 50° C. below the maximum temperature to which the granules are heated, which accounts for a negative temperature gradient in the granules.

The periodical drying process is carried out as follows. Granules are driven through the intensified motion zone into the accumulation zone until the latter is full. The outlet of the accumulation zone is then connected to the inlet of the intensified motion zone, whereupon granules from the accumulation zone are pneumatically forced into the intensified motion zone to circulate through the closed loop thus produced. In both zones the granules are dried by an air flow and a superhigh frequency field. Spent humid air is continuously removed and replaced by an equivalent supply of fresh air. As in the former case, the air temperature is 20° to 50° C. below the maximum temperature to which the granules are heated. The drying is carried out during a specified period of time. When this period expires dried granules are discharged, the accumulation zone is again filled with moist granules, and the foregoing sequence of events is repeated.

The method according to the invention will be explained in greater detail with reference to the following examples.

EXAMPLE 1

The product to be dried is acrylonitrilebutadienestyrene plastic with a mean moisture content of 0.5 percent.

The basic process parameters and equipment are as follows:
 the drying process: continuous;
 eight 2.5-kw superhigh frequency generators;
 full power output: 20 kw;
 oscillation frequency: 2,450 megs;
 air flow rate: 6 m$^3$/min of which 2 m$^3$/min is supplied at t=45° to 50° C.;
 throughput: 350 kg per hour with a final humidity of the product of 0.05 to 0.07 percent;
 throughput: 400 kg per hour with initial humidity of 0.3 percent; 450 kg per hour with initial humidity of 0.2 percent;
 floorspace occupied by the drying apparatus: 11 m$^2$.

EXAMPLE 2

The product to be dried is acrylonitrilebutadienestyrene plastic with a mean moisture content of 0.5 percent.

The basic process parameters and equipment are as follows:
 The drying process: periodical;
 two 2.5-kw superhigh frequency generators;
 full power output: 5 kw;
 oscillation frequency: 2,450 megs;
 air flow rate: 40 m$^3$ per hour of which 12 m$^3$ per hour is supplied at t=45° to 50° C.;
 drying time for continuous circulation of granules in the closed loop: 40 minutes;
 final humidity: 0.05 to 0.07 percent;
 throughput: 80 kg per hour;
 throughput: 90 and 100 kg per hour for initial humidity of 0.3 and 0.2 percent, respectively;
 amount of material charged into the accumulation zone: 60+4 kg;
 floorspace occupied by the drying apparatus: 2.7m$^2$.

The drying time is 30 to 50 minutes for most thermoplastic materials. For example, it takes 30 minutes to reduce an original humidity of 0.5 to 0.7 percent of styrene with methylomethacrylate and of styrene with methylomethacrylate and acrylonitrile to a 0.1 percent level by circulating granules in a closed loop; it takes 45 minutes to reduce the above-mentioned original humidity to a level of 0.05 to 0.07 percent.

The only exception is caprolactam-based materials which take 80 to 90 minutes to dry.

According to the invention, the apparatus for drying granulated dielectric materials is a heating section comprising a superhigh frequency generator 1 (FIG. 1) and a drying chamber which, in turn, comprises a vertical input waveguide 2 and a vertical output waveguide 3 interconnected by a waveguide elbow 4. The waveguide 3 has an air separator 5 arranged at its input and a resonator bin 6 arranged at its output. Connected to the input of the waveguide 2 is an injector-type pneumatic conveyor 7 having an air inlet 8 and a granules inlet 9, and an SHF oscillation energy input 10. The resonator bin 6 has air inlets 11, a branch pipe 12 for removal of spent air and a branch pipe 13 for discharge of granules.

Inserted into the input waveguide 2 and the elbow 4 is a pipe 14 of a dielectric material featuring low SHF oscillation energy absorption. The purpose of the pipe 14 is to prevent clogging of the input 10 with dust and granules, and to narrow down the channel through which granules are carried by the air flow and thus reduce the air consumption.

The air separator 5 is connected to an exhaust blower by a branch pipe 15 and has branch pipes 16 for removal of spent air.

Figure 2:
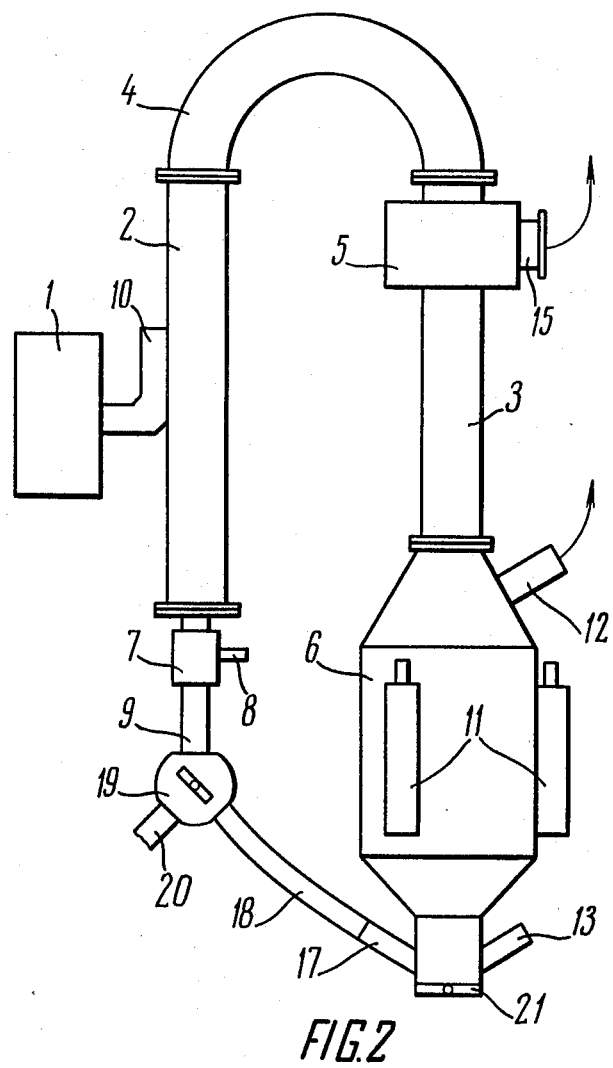
FIG. 2 is a schematic view of an apparatus for drying granulated materials, constructed as a closed granules circulation loop, in accordance with the invention.

The apparatus according to the invention can be modified so that the drying process can be carried out over an unlimited period of time. For this purpose, the resonator bin 6 (FIG. 2) is provided with an outlet 17 communicating by means of a hose 18 and through a valve 19 with the granules inlet 9 of the pneumatic conveyor 7, whereby a closed granules circulation loop is produced. The valve 19 has a granules charging inlet 20. The resonator bin 6 is further provided with a gate means 21.

According to the invention, the apparatus for continuous drying of granulated dielectric materials comprises several (FIG. 3) heating sections, each with an individual superhigh oscillation energy supply. The several or n sections are successively interconnected by pipes 22 to produce a single pneumatic conveyor for a continuous flow of granules through the n sections.

The apparatus according to the invention operates as follows.

As air is forced through the inlet 8 (FIG. 1) into the injector-type pneumatic conveyor 7, granules are sucked through the inlet 9 into the vertical input waveguide 2 and carried by the strong air flow through the smoothly curved waveguide elbow 4. While in motion, the granules are acted upon by the air flow and a superhigh frequency field. The granules then get into the air separator 5 where the air is separated from the flow of granules and directed through the branch pipes 15 and 16 to the exhaust blower. As the granules continue to move through the output waveguide 3, their speed is somewhat reduced by a counter flow forced into the resonator bin 6 through the inlets 11. The force of the counter flow can be adjusted with the aid of a restrictor means installed in the branch pipe 12. When in the waveguide 3, the granules are acted on by superhigh frequency oscillation. As a result, they are heated, while their outer surface is cooled. The granules accumulate in the resonator bin 6 where they are heated by superhigh frequency oscillation and hot air coming through the inlets 11. The spent air and moisture are removed through the branch pipe 12. When the resonator bin 6 is full, an electrocontact level gauge (not shown) is actuated and brings into play a pneumatic conveyor connected to the outlet pipe 15 to discharge the dry granules. The discharge rate corresponds to the feed rate, and the amount of granules discharged from the apparatus is equal to the amount of granules fed to the drying chamber. Thus the drying process is carried out continuously over a predetermined period of time.

The heating temperature is adjusted with the aid of a thermoelement by switching on and off the superhigh frequency generator 1 in the course of the drying process.

Periodic operation by circulating a granulated dielectric material through a closed loop is effected as follows. The outlet 17 is connected by means of the hose 18 (FIG. 2) and through the valve 19 to the inlet 9 of the pneumatic conveyor 7, whereby a closed granules circulation loop is provided for.

The resonator bin 6 is charged through the inlet 20 of the valve 19, the charging being done by the pneumatic conveyor 7. The charging being over, the valve 19 is set in the circulation position, the superhigh frequency generator 1 is switched on, and granules are fed from the resonator bin 6 to the vertical input waveguide 2 where they are exposed to the effects of the air flow and the superhigh frequency field. The granules proceed through the waveguide elbow 4 and the output waveguide 3 to the resonator bin 6, wherefrom the spent air and moisture are directed through the air separator 5 and the branch pipe 15 to the exhaust blower. When in the bin 6, the granules continue to be dried by superhigh frequency oscillation and air heated to a temperature 20° to 50° C. below the maximum permissible temperature to which granules may be heated. The granules circulation speed is varied by adjusting the air flow rate through the pneumatic conveyor 7. The heating temperature is adjusted with the aid of a thermoelement. Upon completing the drying process, the granules are discharged either through the pneumatic conveyor 7 and branch pipe 13 or through the gate means 21, whereupon the charging and drying operations are repeated.

The periodic process with the circulation of granules through a closed loop is advisable for drying limited amounts of a variety products. The process permits of simultaneous drying of a number of different materials.

Figure 3:
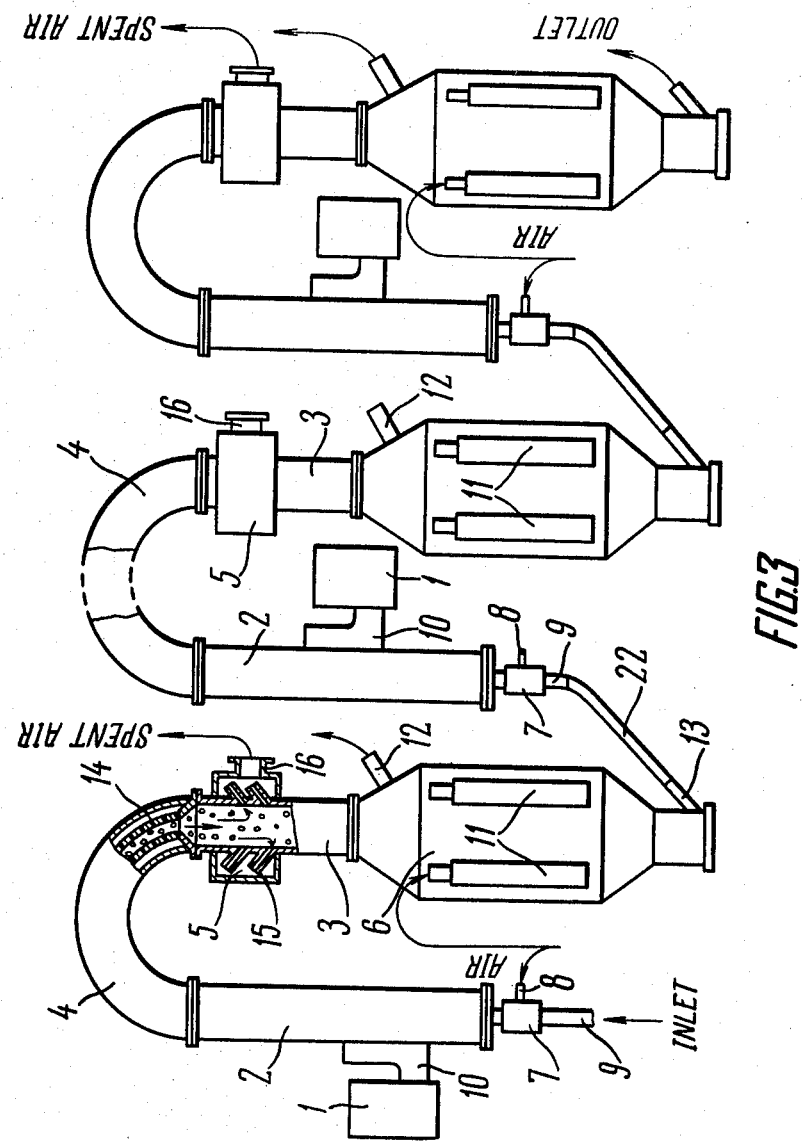
FIG. 3 is a schematic view of an apparatus for continuous drying of granulated dielectric materials, in accordance with the invention.

The embodiment shown in FIG. 3 is intended for continuous operation and comprises n heating sections, each having an individual SHF energy supply. All the n sections are successively interconnected by the pipes 22 to produce a single pneumatic conveyor. The drying process is carried out as in the case of the single-section apparatus.

As the pneumatic conveyor 7 fills the resonator bin 6 of the first drying chamber, a level gauge (not shown) is actuated to simultaneously switch on the superhigh frequency generator 1 and pneumatic conveyor 2 of the second heating section. When the charging of the resonator bin 6 of the second heating section is completed the level gauge is actuated to switch on the superhigh frequency generator 1 of the third heating section and the pneumatic conveyor 7 of the next heating section; this sequence of events goes on until the resonator bin 6 of the last, n-th, section is filled with granules, which is followed by pneumatically unloading the resonator bin 6 of the last section.

The use of a plurality of heating section is advantageous for drying materials with a high bound moisture content. In each section the drying process takes 3 to 8 minutes.

The apparatus according to the invention makes it possible to achieve a complete dehydration of granulated dielectric materials. Naturally, complete dehydration takes more time than normal drying. The apparatus is quite economical with an average power consumption of 50 to 60 watt-hours per kilogramme of a granulated polymer or copolymer material. The apparatus may be of a small size. The drying is highly uniform so that the apparatus can be used for drying cereal and oil crops and eliminating certain pests of these crops. The invention is also applicable to pre-seeding operations.

What is claimed is:

1. A method for drying granulated materials, comprising the steps of
   a. superhigh frequency heating of said granules,
   b. providing a strong air flow in a heating space,
   c. moving said granules at a variable speed through the heating space by using said air flow,
   d. producing a temperature of said air flow that is 20° to 50° C. below the maximum temperature to which said granules are heated to create a negative temperature gradient $\Delta t = \bar{i} \cdot n \cdot 10°$ C., where $\bar{i}$ is the heat and mass transfer vector and $n$ is a positive number,
   e. removing spent moist air from the heating space, and
   f. providing a continuous supply of fresh hot air.

2. A method as claimed in claim 1, wherein said granules are moved at a variable speed in said heating space by producing in the heating space alternating zones of intensified motion of said granules such that the motion of said granules is slowed down.

3. An apparatus for drying granulated dielectric materials, within a heating section comprising,
   a. a superhigh frequency generator,
   b. a drying chamber having a vertical input waveguide and a vertical output waveguide,
   c. a waveguide elbow connecting said input waveguide to said output waveguide,
   d. an air inlet and a granules inlet connected to said unput waveguide,
   e. an air separator located in said vertical output waveguide at the upper section thereof, and
   f. a bin including means for producing resonance arranged at the lower portion of said output waveguide.

4. An apparatus as claimed in claim 3, wherein said bin includes a granules discharge outlet, a hose, a valve and a granules charging inlet such that said outlet of said bin is connected to said granules inlet by said hose and said valve.

5. An apparatus for continuous drying of granulated dielectric materials, comprising a plurality of
   a. heating sections,
   b. a superhigh frequency generator in each said heating section,
   c. a drying chamber in each of said heating sections including an input waveguide and an output waveguide,
   d. a waveguide elbow in each of said heating sections, connecting said input waveguide to said output waveguide,
   e. an air inlet and a granules inlet in each said heating section connected to said input waveguide,
   f. an air separator in each of said heating section arranged at the upper end of said output waveguide,
   g. a bin including means for producing resonance in each of said heating sections, and a plurality of pipes being one less than the total number of said heating sections each connecting a bin of a downstream heating sections to said granules inlet of the next upstream heating section.

* * * * *